(12) United States Patent
Salfity et al.

(10) Patent No.: US 12,311,605 B2
(45) Date of Patent: May 27, 2025

(54) 3D PRINTED OBJECT CLEANING

(71) Applicants: Peridot Print LLC, Palo Alto, CA (US); Nanyang Technological University, Singapore (SG)

(72) Inventors: Jonathan Munir Salfity, Palo Alto, CA (US); William J. Allen, Corvallis, OR (US); Huy Nguyen Dinh, Singapore (SG); Nicholas Adrian, Singapore (SG); Joyce Xin Yan Lim, Singapore (SG); Quang-Cuong Pham, Singapore (SG)

(73) Assignees: Peridot Print LLC, Palo Alto, CA (US); Nanyang Technological University, Singapore (SG)

( * ) Notice: Subject to any disclaimer, the term of this patent is extended or adjusted under 35 U.S.C. 154(b) by 364 days.

(21) Appl. No.: 17/904,331

(22) PCT Filed: Feb. 27, 2020

(86) PCT No.: PCT/US2020/020044
§ 371 (c)(1),
(2) Date: Aug. 16, 2022

(87) PCT Pub. No.: WO2021/173135
PCT Pub. Date: Sep. 2, 2021

(65) Prior Publication Data
US 2023/0067017 A1    Mar. 2, 2023

(51) Int. Cl.
*B29C 64/386* (2017.01)
*B22F 10/80* (2021.01)
*B22F 12/90* (2021.01)
*B33Y 50/00* (2015.01)
*G05B 19/4155* (2006.01)

(52) U.S. Cl.
CPC ............ *B29C 64/386* (2017.08); *B22F 10/80* (2021.01); *B22F 12/90* (2021.01); *B33Y 50/00* (2014.12); *G05B 19/4155* (2013.01); *G05B 2219/35109* (2013.01)

(58) Field of Classification Search
None
See application file for complete search history.

(56) References Cited

U.S. PATENT DOCUMENTS 9,216,544 B2    12/2015    Swanson et al.
9,566,743 B2    2/2017    Kozlak et al.
(Continued)

FOREIGN PATENT DOCUMENTS

CN    102963001 A    3/2013
CN    107089009 A    8/2017
(Continued)

*Primary Examiner* — Ryan A Jarrett
(74) *Attorney, Agent, or Firm* — Shook, Hardy & Bacon (57) ABSTRACT

In one example in accordance with the present disclosure, a system is described. The system includes a reader to extract cleaning instructions associated with a three-dimensional (3D) printed object. The cleaning instructions include a termination condition to indicate when object cleaning is complete. The system also includes a controller to instruct at least one cleaning device to clean the 3D printed object based on the cleaning instructions. A measurement system of the system determines when the termination condition is met.

14 Claims, 6 Drawing Sheets

(56) References Cited

U.S. PATENT DOCUMENTS

| | | |
|---|---|---|
| 9,821,519 B2 | 11/2017 | Schouwenburg |
| 10,377,061 B2 | 8/2019 | Wolfgang et al. |
| 2004/0061878 A1 | 4/2004 | Vives et al. |
| 2009/0011066 A1 | 1/2009 | Davidson et al. |
| 2013/0310965 A1 | 11/2013 | Schouwenburg |
| 2016/0214324 A1 | 7/2016 | Schouwenburg |
| 2017/0113413 A1 | 4/2017 | Iwase et al. |
| 2017/0239893 A1 | 8/2017 | Hoover et al. |
| 2017/0274595 A1 | 9/2017 | Swartz et al. |
| 2018/0012311 A1 | 1/2018 | Small et al. |
| 2018/0036950 A1 | 2/2018 | Vilajosana et al. |
| 2018/0136633 A1 | 5/2018 | Small et al. |
| 2018/0339456 A1 | 11/2018 | Czinger et al. |
| 2019/0126606 A1 | 5/2019 | Fornos et al. |
| 2019/0180291 A1 | 6/2019 | Schmeling et al. |
| 2019/0210106 A1 | 7/2019 | Gibson et al. |
| 2019/0217645 A1 | 7/2019 | Campbell |
| 2022/0097305 A1* | 3/2022 | Erickson ............ G06K 19/0723 |
| 2022/0258426 A1* | 8/2022 | Murciego Rodriguez .................. B08B 5/02 |

FOREIGN PATENT DOCUMENTS

| | | |
|---|---|---|
| CN | 109476147 A | 3/2019 |
| DE | 102013217686 A1 | 3/2015 |
| WO | 2016/165745 A1 | 10/2016 |
| WO | 2018/135736 A1 | 7/2018 |
| WO | 2019/152064 A1 | 8/2019 |
| WO | 2019/212485 A1 | 11/2019 |

* cited by examiner

3D PRINTED OBJECT CLEANING

BACKGROUND

Additive manufacturing systems produce three-dimensional (3D) objects by building up layers of material. Some additive manufacturing systems are referred to as "3D printing devices" because they use inkjet or other printing technology to apply some of the manufacturing materials. 3D printing devices and other additive manufacturing devices make it possible to convert a computer-aided design (CAD) model or other digital representation of an object directly into the physical object.

BRIEF DESCRIPTION OF THE DRAWINGS

The accompanying drawings illustrate various examples of the principles described herein and are part of the specification. The illustrated examples are given merely for illustration, and do not limit the scope of the claims.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Additive manufacturing systems make a three-dimensional (3D) object through the solidification of layers of build material. Additive manufacturing systems make objects based on data in a 3D model of the object generated, for example, with a computer-aided drafting (CAD) computer program product. The model data is processed into slices, each slice defining portions of a layer of build material that is to be solidified.

In one example, to form the 3D object, a build material, which may be powder, is deposited on a bed. A fusing agent is then dispensed onto portions of the layer of build material that are to be fused to form a layer of the 3D object. The system that carries out this type of additive manufacturing may be referred to as a powder and fusing agent-based system. The fusing agent disposed in the desired pattern increases the energy absorption of the underlying layer of build material on which the agent is disposed. The build material is then exposed to energy such as electromagnetic radiation. The electromagnetic radiation may include infrared light, laser light, or other suitable electromagnetic radiation. Due to the increased heat absorption properties imparted by the fusing agent, those portions of the build material that have the fusing agent disposed thereon heat to a temperature greater than the fusing temperature for the build material. As used in the present specification and in the appended claims, the term "powdered build material" or "build material" is meant to refer to any form of particulate material and may include various types of material including plastic, metal, and ceramic.

Another way of 3D printing selectively applies binder to build material which glues particles of the build material together. In this example, a "green" part is prepared by selectively applying a binding agent to powdered build material. The green part is then removed from the printer and loaded into a sintering furnace. Sintering with gradually increasing temperature and using appropriate ambient pressure burns out the binding agent while simultaneously sintering particles with binding agent disposed thereon.

In yet another example, a laser, or other power source is selectively aimed at a powder build material, or a layer of a powder build material, to form a slice of a 3D printed part. Such a process may be referred to as selective laser sintering. In yet another example, the additive manufacturing process may use selective laser melting where portions of the powder material, which may be metallic, are selectively melted together to form a slice of a 3D printed part.

In yet another example, the additive manufacturing process may involve using a light source to cure a liquid resin into a hard substance. Such an operation may be referred to as stereolithography.

While such additive manufacturing operations have greatly expanded manufacturing possibilities, further development may make the 3D printing process even more practical. For example, these types of manufacturing processes, or others, justify a cleaning operation, or other operation wherein unwanted material is removed, before the part is ready to use. For example, as a result of the additive manufacturing process, powder from the bed may be caked onto the fused part. That is, even though the amount of energy applied to the powder bed material does not completely fuse unfused portions, the unfused portions may clump together, or "cake."

As a specific example, heat from energy absorbed by fused portions of the build material may transfer by conduction to immediately adjacent unfused portions of the build material. This is sometimes referred to as thermal bleed and can cause unfused build material to permanently or semi-permanently adhere to the 3D printed object. For a variety of reasons, it may be desirable to remove this caked material.

For example, unfused build material can be recycled and re-used in later 3D printing operations. However, when the unfused build material cakes, it is no longer recyclable. Accordingly, it may be desirable to remove the caked material so that it can be recycled and reused. Moreover, the caked material obviously reduces the geometric accuracy, aesthetics, and potential functionality of the resulting 3D printed object. However, removal of this material can be difficult, time-consuming, and in some cases may even damage the 3D printed object.

In some cases, the caked material is removed via manual labor. That is, a human operator grasps and cleans the 3D printed object. However, cleaning operations can be dirty and exposure to the build material may potentially pose a health risk to the operator. Moreover, after printing, the 3D printed objects may be too hot to touch.

In another example, for example a stereolithographic example, unwanted artifacts may be left on the surface, such as a rough spot where a build support was broken off. Similar to a fusing agent-based system, a user may manually operate to grasp and remove these unwanted artifacts.

Accordingly, the present specification describes robotic and automated systems for cleaning a 3D printed object and/or removing unwanted material from a 3D printed object. Specifically, according to the present specification, a system removes unwanted material from a 3D printed object. In a particular example of a powder-based process, the system cleans powder from the 3D printed object based on cleaning instructions associated with the 3D printed object. The cleaning instructions identify at least one, and in some cases, multiple locations where the 3D printed object may be grasped and also includes information to indicate when a part is satisfactorily cleaned.

As a specific example, a 3D printed object may first be designed through a computer aided design (CAD) tool. After the 3D printed object is created in CAD but before the part is built and cleaned, an analysis is performed to produce information on 1) specific grasping locations and 2) specific decaking and cleaning instructions.

In some examples, the grasping and decaking/cleaning instructions may be received from external sources and added to a file associated with the 3D printed object. For example, a user may suggest grasping locations of contact and/or cleaning motions. This information may be encoded in the 3D printed object or referred to a pointer encoded in the 3D printed object, or may be otherwise associated with the 3D printed object.

Specifically, the present specification describes a system. The system includes a reader to extract cleaning instructions associated with a three-dimensional (3D) printed object. The cleaning instructions include a termination condition to indicate when object cleaning is complete. The system also includes a controller to instruct at least one cleaning device to clean the 3D printed object based on the cleaning instructions. A measurement system of the system determines when the termination condition is met.

The present specification also describes a method. The method includes extracting cleaning instructions associated with a 3D printed object. The cleaning instructions include a termination condition to indicate when object cleaning is complete. Cleaning operations are executed based on the cleaning instructions. During execution of the cleaning operations, a characteristic of the 3D printed object is measured and responsive to this characteristic meeting the termination condition, the cleaning operations are terminated.

The present specification also describes a non-transitory machine-readable storage medium encoded with instructions executable by a processor. The machine-readable storage medium includes instructions to 1) identify a 3D printed object, 2) extract cleaning instructions associated with the 3D printed object, and 3) determine from the cleaning instructions, cleaning device parameters specific to the cleaning devices of a cleaning station. The machine-readable storage medium also includes instructions to 1) identify a pose of the 3D printed object and 2) execute cleaning operations based on the cleaning instructions.

Such systems and methods 1) provide accurate 3D printed object cleaning; 2) allow for complex cleaning operations to be executed with precision; 3) provide customized cleaning operations that are specific, and not generic; and 4) increase safety and efficiency of 3D printed object cleaning. However, it is contemplated that the devices disclosed herein may address other matters and deficiencies in a number of technical areas.

As used in the present specification and in the appended claims, the term "pose" refers to an identification of various positional characteristics of the 3D printed object. For example, a pose may include a position along three axes (x, y, and z) of a reference frame as well as rotation about those axes (pitch, yaw, and roll).

Further, as used in the present specification and in the appended claims, the term "cleaning" may refer to any operation wherein unwanted material is removed from a 3D printed object. For example, in a powder-based system, the cleaning and associated cleaning instructions may relate to the removal of caked build material. In the example of a stereolithographic operation, the cleaning and associated cleaning instructions may relate to the removal of unwanted build material such as rough spots where a build support has been removed.

Further, as used in the present specification and in the appended claims, the terms "reader," "controller," "measurement system," and "pose determining system," may refer to electronic components which may include a processor and memory. The processor may include the hardware architecture to retrieve executable code from the memory and execute the executable code. As specific examples, the "reader," "controller," "processor," and "pose determining system," as described herein may include computer readable storage medium, machine-readable storage medium and a processor, an application specific integrated circuit (ASIC), a semiconductor-based microprocessor, a central processing unit (CPU), and a field-programmable gate array (FPGA), and/or other hardware device.

As used in the present specification and in the appended claims, the term "machine-readable storage medium" refers to machine-readable storage medium that may be a tangible device that can retain and store the instructions for use by an instruction execution device. The machine-readable storage medium may be an electronic storage device, a magnetic storage device, an optical storage device, an electromagnetic storage device, a semiconductor storage device, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), and a memory stick.

Figure 1:
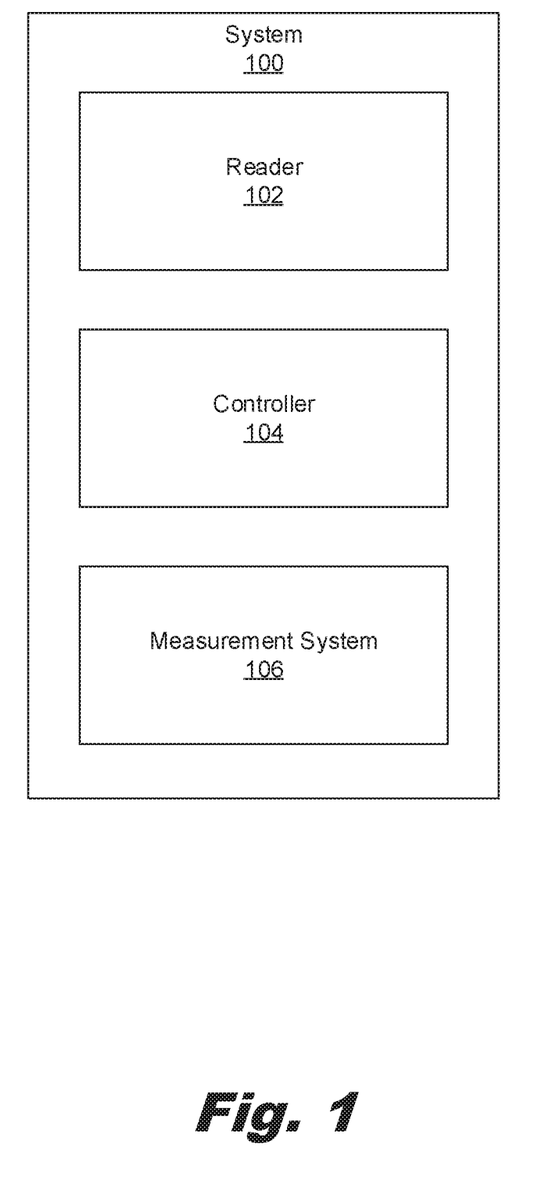
FIG. 1 is a block diagram of a system for three-dimensional (3D) printed object cleaning, according to an example of the principles described herein.

Turning now to the figures, FIG. 1 is a block diagram of a system (100) for three-dimensional (3D) printed object cleaning, according to an example of the principles described herein. In some examples, the system (100) may form part of a post-printing system. For example, once a 3D object is printed, it may be moved, either manually or by an automated device, from the additive manufacturing system and passed to a post-printing system such as a cleaning station. There the system (100) may operate to clean the 3D printed object.

The system (100) may include a reader (102) to extract cleaning instructions associated with the 3D printed object. In some examples, the reader (102) may extract other information. For example, the reader (102) may identify the 3D printed object. That is, before cleaning instructions can be extracted from a 3D printed object, the 3D printed object is to be identified such that associated cleaning instructions can be determined. This may be done in a number of ways. For example, the physical analysis of the 3D printed object to be cleaned may be carried out. In another example, as detailed below, the reader (102) may extract encoded identifying data from the 3D printed object.

The cleaning instructions may include a variety of pieces of information and are used to carry out cleaning operations. For example, the cleaning instructions may identify cleaning modalities, that is the cleaning devices that are to be used to clean the 3D printed object. For example, based on characteristics of the build material, the 3D printed object geometry, and/or the operations of the additive manufacturing process it may be desirable to carry out or prevent certain types of cleaning. For example, sandblasting a part may be appropriate in some cases. However, for delicate parts, or delicate regions of parts, a different modality such as a blast of air may be desired to clean the 3D printed object. In addition to detailing cleaning modalities, the cleaning instructions may indicate cleaning forces to be used.

In some examples, the cleaning devices used may be mobile, such as a nozzle on a robotic arm. As another example, a robotic device grasps and moves the 3D printed object. In this example, the cleaning instructions may include tool paths which indicate movements in three-dimensional space that the cleaning devices move about the 3D printed object during cleaning.

The cleaning instructions may also include grasp parameters for the 3D printed object during cleaning. That is, as described above, a device such as robotic fingers or a suction nozzle may move the 3D printed object during the cleaning operation. In this example, the grasp parameters may indicate such things as locations on the 3D printed object where the device can safely grasp the 3D printed object without undue damage. The grasp parameters may also indicate a force that may be used to grasp the 3D printed object at the specified location, again without exerting too much force as to damage the 3D printed object.

Another example of information that may be included in the cleaning instructions includes a sequence of cleaning operations and a sequence of cleaning motions. That is, as described above a variety of cleaning modalities at a variety of cleaning forces may be compiled together in particular sequences to clean the 3D printed object. For example, it may be the case that a 3D printed object is first passed over bristles to remove lightly-adhered caked material and that more strongly attached caked material is subsequently removed via a sandblasting operation. Accordingly, each of these cleaning "primitives" as well as the movements of the different cleaning devices, be they robotic movement devices or the cleaning instruments themselves, are programmed as a sequence in the cleaning instructions. Accordingly, from a database of cleaning primitives, a customized cleaning instruction may be generated for a particular 3D printed object. Yet another example of information that may be included is a duration of the cleaning operation and/or a duration of each of the cleaning primitives that make up the cleaning instructions.

Accordingly, given the wide variety of primitives that can be encoded in the cleaning instructions, the present system provides for the execution of complex and customized cleaning instructions, rather than generic cleaning instructions that are applied to all 3D printed objects regardless of their specific characteristics. Such customized instructions may be more efficient and cheaper to implement than more generic cleaning instructions. For example, within a batch of 3D printed objects, there may be many different types of parts, including different geometries that justify different grasping, manipulation, and cleaning operations. Rather than using repeated automated methods, where all parts are moved through a processing station such as an automated sandblaster tumbler or a car-wash like station, the present system (100) treats each part individually.

In one particular example, the cleaning instruction may include a termination condition to indicate when object cleaning is complete. Without such a termination condition, cleaning may go on for a predetermined amount of time that may be too long or too short. If too short, the 3D printed object may not be effectively cleaned. By comparison, if too long, 3D printed object manufacturing time may be unnecessarily prolonged as it is exposed to cleaning operations when already clean. That is, the cleaning instructions may include an evaluation of cleanliness, i.e. a termination state for the cleaning cycle.

The termination condition may indicate a threshold value for a particular characteristic of the 3D printed object. For example, the termination condition may be a target color for the 3D printed object. That is, a pigment may be added to the fusing agent such that the fused build material is a different color than the unfused and caked build material. In other examples, a coloring agent may be added in addition to the fusing agent or the fusing agent may have a color associated with it. In this example, termination may be determined by an optical system that can measure and record material color. As a region of the 3D printed object matches an expected color as defined as a termination condition, cleaning may advance to another region and when the entire 3D printed object has an expected color, it may be determined that the part is adequately cleaned.

Another example of a termination condition is a target weight for the 3D printed object. That is, knowing the properties of the fused build material and the 3D printed object geometry, a target weight may be determined. Similar to the color example, when the weight of the 3D printed object matches the target weight, it may be determined that the 3D printed object is adequately cleaned.

Another example of a termination condition is a target geometry for the 3D printed object. That is an optical reader such as a camera can measure the actual geometry of the 3D printed object or region of the 3D printed object to determine whether the measured geometry matches a target geometry in an associated digital file to determine when the 3D printed object has been adequately cleaned.

As yet another example, a target reflectivity of the 3D printed object may be compared against an actual surface reflectivity of the 3D printed object to determine when the 3D printed object has been adequately cleaned. While particular reference is made to particular termination conditions, other termination conditions may be included in the cleaning instructions, and used to determine termination of the cleaning cycle.

In some examples, the reader (102) extracts just those cleaning instructions that relate to the cleaning station in which the system (100) is disposed. That is, the cleaning instructions may include any of the aforementioned pieces of information for a variety of cleaning modalities. However, a specific cleaning modality may be used by a particular cleaning station. Accordingly, in this example, the reader (102) extracts just the pertinent instructions. As a particular example, a cleaning station may implement an air nozzle to clean 3D printed objects and the cleaning instructions may include instructions for sand blasting, brushing, and air blasting. Accordingly, in this example, the reader (102) acquires information related to the characteristics of the cleaning station and extracts just the cleaning instructions related to the air nozzle used by that cleaning station.

The reader (102) may extract the cleaning instructions in a variety of ways. In one example, the shape of the 3D printed object itself may allow the 3D printed object to be identified. With the identity of the 3D printed object determined, cleaning instructions may be extracted, for example from a remote location such as a server. As a particular example, an optical system may determine that the 3D printed object is a water bottle. Recognizing that it is a water bottle, the reader (102) can extract, from a database or a remote server, instructions on how to grasp the water bottle.

As another specific example, a build batch may include a number of 3D printed objects, which may have different physical and material properties, and therefore different cleaning instructions. The reader (102) may access captured images of the 3D printed object. These images may then be analyzed to determine an outline of the 3D printed object. The outline of the 3D printed object may be compared to files to determine the identity of the 3D printed object.

As another example, the reader (102) may extract cleaning instructions and an identity of the 3D printed object by extracting encoded cleaning instructions from the 3D printed object to be cleaned. That is, the cleaning instructions may be embedded on the 3D printed object itself.

Such encoded data may take many forms. For example, the cleaning instructions may be encoded on an RFID chip on a surface or embedded inside the 3D printed object. When interrogated by an RF-type reader (102), the cleaning instructions are passed to a controller (104) for directing the cleaning devices. As yet another example, the information may be stored in electromagnetic resonators with distinct frequency responses.

The cleaning instructions may be encoded and formed in other ways as well. For example, a 3D printed object may be encoded with a data payload on the surface of the object. The data may be stored and hidden, or encoded, on the object in any number of ways. For example, the data may be visually imperceptible or may be identified by close inspection and yet be in a format unreadable to humans. That is, the data may not include alphanumeric characters and may instead encode data based on any number of non-alphanumeric fashions including color patterns, raised/unraised surface patterns, and surface texture characteristics.

As a specific example, a 3D printed object may include layers of ink that are transparent to visible wavelengths of light and yet absorb infrared wavelengths. Such inks may be used to print a pattern representative of the encoded data that is invisible to the human eye, or otherwise visually imperceptible. In this example, the reader (102) may be an infrared camera/illumination system that can detect the encoded component-specific assembly instructions on the 3D printed object.

In another example, as mentioned above, the encoded data may be inside the 3D printed object. For example, a black bar code may be printed on an otherwise white component. This layer may be covered with a thin layer of white plastic or paint. In this example, under low light conditions, the bar code would be difficult or impossible to see under low light levels through the thin layer of white plastic or paint. However, when a bright light was put onto the object, the black bar code just below the surface would become visible.

In one example, the cleaning instructions may be encoded and formed as slight changes to color, i.e., via color mottling. For example, pixel values may be slightly altered, which alteration value is indicative of a bit of information, which when extracted serves to communicate the data payload, i.e., the cleaning instructions.

In another example, the component includes a pattern of raised surfaces. The orientation, shape, and or height of the different surfaces may be detected with different angles, shapes, and/or heights mapping to different bits. Accordingly, in this example, the cleaning instructions may be converted into a pattern of raised surfaces. In this example, the reader (102) may include an optical light-based scanner that can detect, via light beams or other detectors, the angles, shapes, and/or heights such that the encoded data mapped to these characteristics can be extracted.

While particular reference is made to certain types of encoded data, other forms of encoded data may be used such as quick response (QR) codes, barcodes, 2D matrix codes, and steganographic images to name a few. As described above, the reader (102) may include a specialized sensor to extract the information. In other examples, the reader (102) may analyze information received from a device such as a camera to obtain and decode the cleaning instructions.

While particular reference is made to encoded data being formed on the 3D printed object itself, the encoded may be formed on a sprue attached to or retaining the 3D printed object.

In another example, rather than extracting the encoded cleaning instructions from the 3D printed object itself, the cleaning instructions may be extracted from a location referenced by the encoded data on the 3D printed object to be cleaned.

In these examples, the reader (102) may decode the encoded data to generate cleaning instructions for the 3D printed object. For example, the reader (102) may access a mapping between the encoded data and bits of data such that when encoded data is detected, the reader (102) may discern an associated bit, or set of bits, to decode the encoded cleaning instructions. Accordingly, the reader (102) is tailored to the specific form of the encoded data. For example, if the data is encoded as a color mottling, the reader (102) extracts the color differences and identifies the pixel values at each location and references a database to decipher the data based on the associated pixel values. Note that as described above, the encoded information may be used as a reference. That is, the encoded information may be the cleaning instructions themselves, or may be a reference to a location where the cleaning instructions are stored.

In some examples, the aforementioned acquisition of cleaning instructions via encoded data may be executed in the event a physical analysis of the 3D printed object does not result in an identification of the 3D printed object. That is, there may be too much caked material on the 3D printed object such that outline recognition is inconclusive. In this example, encoded data, either the cleaning instructions themselves or a pointer to the cleaning instructions, may be decoded via any of the above-mentioned operations.

Once the 3D printed object is recognized, the system (100) executes the instructions (either encoded with/on the part or referenced by data encoded in/on the part) on how to grasp and clean the 3D printed object. Specifically, the system (100) includes a controller (104) to instruct at least one cleaning device to clean the 3D printed object based on the cleaning instructions. That is, a cleaning station may include any number of robotic or passive devices that are used to clean the caked build material away from the 3D printed object. Examples of such cleaning devices include a robotic grasping arm, a suction nozzle, a sand blast nozzle, an air blast nozzle, and any variety of active or passive mechanical cleaning devices such as brushes. In this example, the cleaning instructions provide commands to implement each of these cleaning devices in a particular way so as to effectuate a desired cleaning of the 3D printed object. In other words, the cleaning instructions provide the guidance for the cleaning operation and the controller executes those instructions.

The system (100) may also include a measurement system (106) to determine when the termination condition is met. That is, as described above, the cleaning instructions, which may be particularly defined for a particular 3D printed object, may set a threshold for a characteristic, which indicates that the 3D printed object has been sufficiently cleaned. For example, when the threshold condition is a weight, the measurement system (106) may continuously or periodically weigh the 3D printed object as it is being cleaned and compare the resulting weight value to a target value. When reached, it may indicate that enough unfused build material has been removed. By comparison, if the weight of the 3D printed object is greater than the target value, this may indicate that unfused build material still resides on the 3D printed object and should be removed so as to preserve part geometry and aesthetics. As will be described in connection with FIG. 4, the measurement system (106) may be a variety of types.

Figure 2:
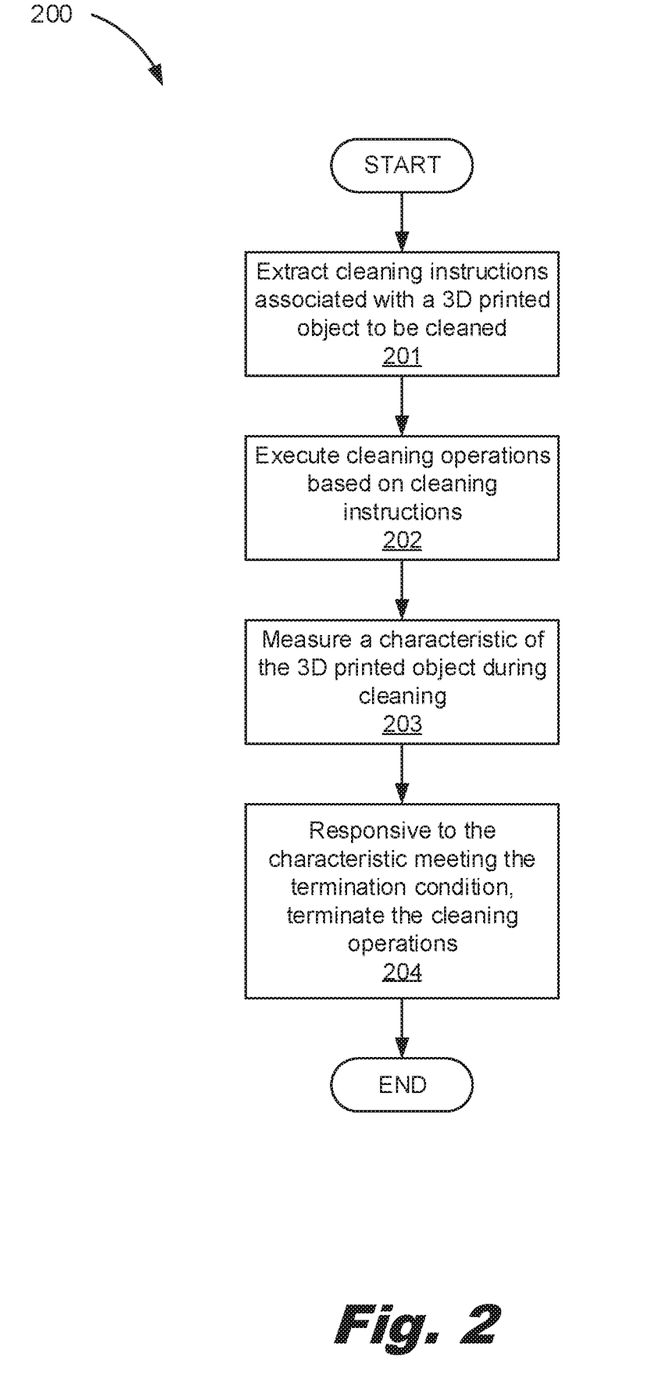
FIG. 2 is a flow chart of a method for 3D printed object cleaning, according to an example of the principles described herein.

FIG. 2 is a flow chart of a method (200) for 3D printed object cleaning, according to an example of the principles described herein. According to the method (200) cleaning instructions that are associated with a 3D printed object are extracted (block 201). That is to say, as different 3D printed objects have different material and dimensional characteristics, it may be desirable to provide cleaning instructions specifically related to the particular 3D printed object. As described above, the extraction (201) may take different forms. For example, an analysis of the dimensions of the 3D printed object may allow an identity of the 3D printed object to be determined and cleaning instructions may be extracted (block 201) from a remote location or a local database.

In another example, a storage element, such as a radio-frequency identification (RFID) chip may be stored on or in the 3D printed object. This RFID chip, or other element may store the cleaning instructions or reference a location where the cleaning instructions are stored. In another example, some encoding on the 3D printed object may be decoded by the reader (FIG. 1, 102) to determine the cleaning instructions.

As described above, the cleaning instructions may include a termination condition which guides the cleaning of the 3D printed object. That is, cleaning operations are executed (block 202) based on the cleaning instructions and a characteristic of the 3D printed object is measured (block 203) during execution of the cleaning operations. That is, once the 3D printed object is recognized and oriented, the information regarding grasping, manipulation, decaking and cleaning is sent to the cleaning devices. The cleaning devices implement the techniques (either encoded with/on the part or referenced by data encoded in/on the part) on how to grasp and clean the 3D printed object.

The termination condition and characteristic may be of a variety of types including weight, color, reflectivity, and/or geometry. Responsive to the characteristic meeting the termination condition, the cleaning operation is terminated (block 204). In some examples, the cleaning instructions may be executed (block 202) iteratively until the termination condition is met. For example, if after a cleaning instruction has been entirely executed, it may be determined whether the termination condition has been met. If not, the cleaning instructions are again executed (block 202). Once the termination condition is met, the cleaning operation is terminated (block 204).

That is, the present method (200) describes the encoding of cleaning instructions for a 3D printed object and then using those cleaning instructions throughout cleaning to determine when a part has been sufficiently cleaned. Without such termination conditions, cleaning may go on for too long, or may not be executed for long enough of a period of time and thereby may be ineffective and or inefficient.

Figure 3:
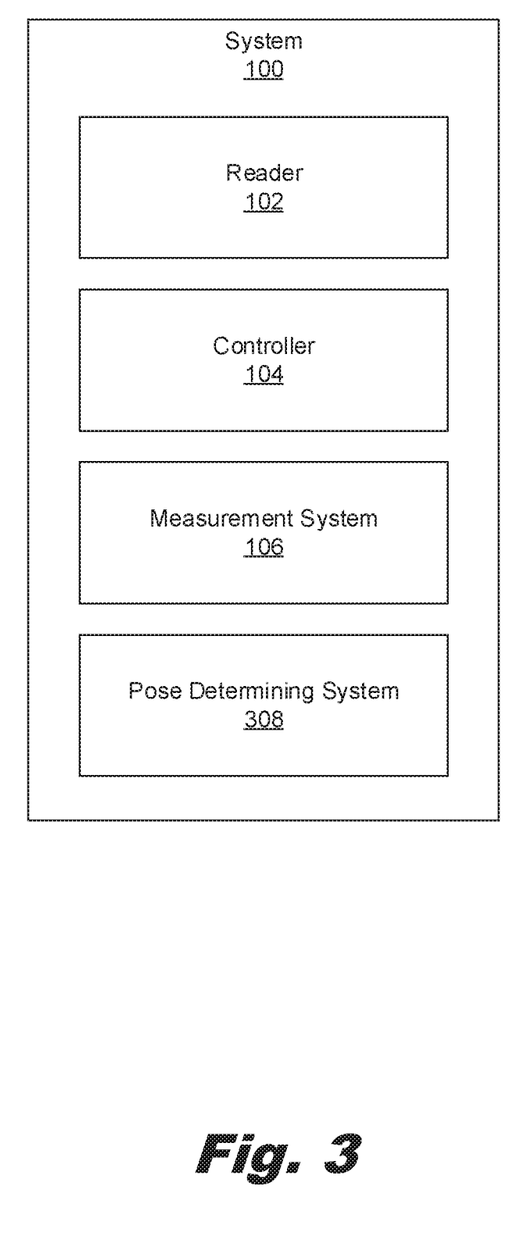
FIG. 3 is a block diagram of a system for three-dimensional (3D) printed object cleaning, according to an example of the principles described herein.

FIG. 3 is a block diagram of a system (100) for three-dimensional (3D) printed object cleaning, according to an example of the principles described herein. As described above, the system (100) may include a reader (102), controller (104), and measurement system (106) that work together to clean a 3D printed object based on customized cleaning instructions specific to that 3D printed object and which use a termination condition within the cleaning instructions to dynamically terminate object cleaning, rather than operating based on some predetermined, ambiguous and therefore ineffective cleaning cycle.

The system (100) may include a pose determining system (308) to identify a pose of the 3D printed object. For example, as described above the cleaning instructions may proscribe certain operations be performed on specific regions of the 3D printed object. Accordingly, the pose system (308) determines the orientation and pose of the 3D printed object such that the correct operations can be performed relative to the 3D printed object.

For example, cleaning instructions may indicate a grasp location near the bottom of a cup while sandblasting an interior bottom of the cup followed by a grasp location around the cup rim while sandblasting the exterior bottom of the cup. However, before executing these operations, the pose determining system (308) identifies where the bottom, rim, and interior of the cup are. Once a full pose of the 3D printed object is determined, a manipulator robot can precisely grasp the 3D printed object appropriately without accidentally damaging it. Accordingly, such a system avoids reliance on a manipulator arm with active force sensors giving feedback from its gripper components.

As a particular example, the pose can be used to position a cleaning device, such as a sandblaster, appropriately with respect to the 3D printed object since cake-ablation rate is dependent upon the distance between the sandblaster and the surface of the 3D printed object. Also, if the sandblaster is too close to the surface, especially when it's a delicate object, it can ablate away printed part material (not just powder) or can destroy fragile parts or part portions. Accordingly, the operation of determining a pose of the 3D printed object allows for precise and correct post-processing operations to be executed without damaging the 3D printed object itself.

The pose of the 3D printed object may be found in a variety of ways. In one example, features are formed on or in the 3D printed object that allow the part to be localized by moving the 3D printed object along paths and measuring accelerations experienced by each feature. In this manner, the location and orientation of each feature can be determined. Such localization is enabled even when parts are surrounded by optically opaque material.

In a specific example, accelerometers are placed at predetermined poses relative to a 3D printed object. Following fabrication, the 3D printed object which includes the object-embedded accelerometers is manipulated in a predetermined fashion. Specifically, a robotic arm may grab the 3D printed object based on an output from a vision system initially to impart this motion that generates the outputs of the accelerometers that are used to determine 3D printed object pose. Based on information received from the accelerometers in conjunction with the tracked movements of the 3D printed object, the position and orientation of the 3D printed object may be determined such that the controller (104) can properly instruct respective cleaning operations. While particular reference is made to accelerometers, other types of inertial measuring devices may be used such as a gyroscope or magnetometer among others.

In some examples, the accelerometer may also provide an identity of the 3D printed object, which is used by the reader (102). For example, the accelerometer may have a particular energy signal that is detected by the processor of the pose determining system (308). In this example, the received energy signal is passed to the reader (102) which determines an identify of the object based on the received information. For example, the reader (102) may consult a database that has a mapping between energy signals and object identifiers.

Thus, the present system (100) allows for identification of a pose, that is a six value coordinate such as a displacement along the X axis, a displacement along the Y axis, a displacement along the Z axis, angular rotation about the Z axis, angular rotation about the X axis, and angular rotation about the Y axis, within a mass by receiving measured acceleration magnitudes off of accelerometers disposed within a mass, and by knowing the actual acceleration vectors on the mass itself.

In another example, the pose determining system (308) interacts with resonators placed at predetermined poses relative to a 3D printed object. By stimulating these resonators with energy and measuring the characteristics of the reflected energy, such as the intensity, direction, and polarization of the reflected signals, a system may determine the poses of the resonators relative to the external energy source.

Accordingly, in this example, the pose determining system (308) includes at least one directional antenna. In some examples, the directional antenna(s) may be stationary relative to a cleaning stage. In other examples, the directional antenna(s) rotate about the 3D printed object. The directional antenna(s) may emit energy at any of a variety of frequencies. Specifically, the directional antenna(s) may emit various forms of electromagnetic radiation, which may include infrared light, laser light, or other forms of suitable electromagnetic radiation. The 3D printed object may include a resonator, which preferentially reflects energy in a certain frequency band of electromagnetic waves. That is, the resonator, will reflect energy at certain resonant frequencies, which resonant frequencies are received at the directional antenna(s) and used to determine resonator location and pose. The identity and location of the resonator allow a determination of the 3D printed object location and pose.

In some examples, the 3D printed object is moved about relative to the directional antenna(s). As the 3D printed object is moved, the orientation of the resonator relative to the direction antenna(s) changes. This change in orientation affects the strength, and potentially the polarization, of the received reflected signal. Based on the characteristics of the received reflected signal, the resonator-based pose system (308) may determine a pose of the 3D printed object.

In either case, the pose determining system (308) may include a processor to receive data from either the accelerometers and resonators. For example, the processor of the pose determining system (308) accesses a database that includes information on various 3D printed objects that have been made. For example, the database may include a library of dimensions of 3D printed objects. The database may also indicate where, within each 3D printed object, a resonator or accelerometer is disposed. That is, knowing the pose of the accelerometer or resonator relative to the pose of the 3D printed object, and knowing the pose of the resonator or accelerometer allows for a determination of the pose of the 3D printed object.

In another example, a point cloud may be used to determine the object pose. In this example, the pose determining system (308) includes a processor and a 3D camera capable of collecting data points representing the depth distance of the 3D printed object surface from the 3D camera. In some examples, the data points indicate an x, y, and z coordinate points for each point registered from the 3D printed object surface. With these 3D data points from the 3D printed object surface, geometrical properties such as a center of mass and orientation of the 3D printed object can be inferred, leading to the estimation of the object pose. In some examples, the 3D data points may match a predetermined object, for example from a database. In this case, the pose might be determined by comparing and aligning the 3D data points distribution from the 3D camera against the predetermined object information in database.

While particular reference is made to a few pose determining system (308) operations, other mechanisms may be used to determine a pose of the 3D printed object such as image analysis. In this example, the pose determining system (308) may include a camera to capture an image of the 3D printed object, which image may then be analyzed to determine the 3D printed object pose.

Accordingly, the present system (100) describes a way to automate and customize a cleaning process. In this particular example, the system (100) determines the location and orientation of the 3D printed object so that the automated systems can delicately grasp the 3D printed object without excessive force so as to not damage the 3D printed object and such that precise cleaning can be performed.

Figure 4:
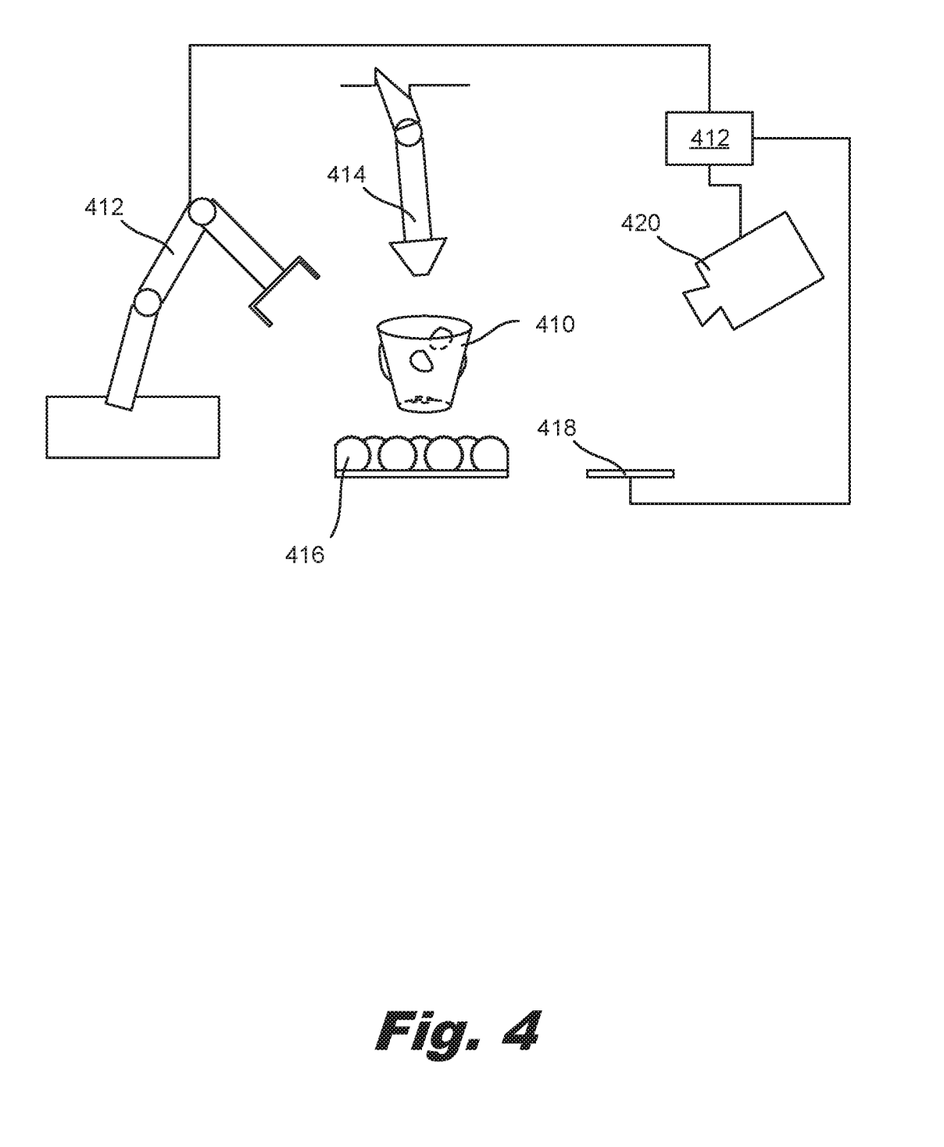
FIG. 4 is a diagram of an environment for 3D printed object cleaning, according to an example of the principles descried herein.

FIG. 4 is a diagram of an environment for 3D printed object (410) cleaning, according to an example of the principles described herein. In the example depicted in FIG. 4, the 3D printed object (410) to be cleaned is a cup. As can be seen in FIG. 4, the cup may have various clumps of caked, but unfused, build material disposed thereon. As described above, the system (FIG. 1, 100) controls operation of the cleaning devices that clean the 3D printed object (410), which in this example include a robotic arm (412) to grasp the 3D printed object (410), an air nozzle (414) to generate an air stream towards the 3D printed object (410) to remove caked build material, and a brush pad (416) against which the robotic arm (412) can rub the 3D printed object (410) to remove certain caked build material.

FIG. 4 also depicts various components that may make up the measurement system (FIG. 1, 106). That is, in one example, the measurement system (FIG. 1, 106) may include an optical system that includes a number of cameras (420) or other scanning device to capture images of the 3D printed object (410). In some examples, the camera (420) may be either a two-dimensional camera or a three-dimensional camera (420) as described above to capture 2D or 3D images, respectively of the 3D printed object (410) so as to identify its pose and measure a characteristic for eventual comparison against any termination condition.

The captured images may be used for a variety of reasons. For example, the captured images may be passed to the reader (FIG. 1, 102) which can analyze the shape of the 3D printed object (410) as represented in the images to determine an identity of the 3D printed object (410) such that cleaning instructions can be obtained. In another example, the reader (FIG. 1, 102) analyzes the captured images to ascertain encoded cleaning instructions, an encoded identifier, and/or an encoded point to the remotely-stored cleaning instructions.

In another example, the camera (420) may form part of the pose determining system (FIG. 3, 308) to determine the shape and pose of the 3D printed object (410), such that the automated cleaning operations may be carried out. That is, the camera (420) provides the pose of the 3D printed object (410) so that proper tool paths and grasping holds can be used to clean the object.

As part of the measurement system (FIG. 1, 106), the camera (420) captures information used by a processor (412) to compare a characteristic of the 3D printed object (410) with the termination condition. That is, as described above, the termination condition represents a target value for a characteristic, that when reached, instigates termination of the cleaning operation. The camera (420) documents the characteristic and the processor (412) determines whether the characteristic meets the termination condition. For example, in the example where an object color is a termination condition. The camera (420) may take images of the 3D printed object (410) and the processor (412) may analyze the images to determine and compare the actual color of the 3D printed object (410) with the color termination condition. When the two values match, the camera-based measurement system (FIG. 1, 106) may trigger the controller (FIG. 1, 104) to terminate cleaning.

In another example, the measurement system (FIG. 1, 106) includes a scale (418) to weigh the 3D printed object (410). In the example where an object weight is a termination condition, the scale (418) may take a weight of the 3D printed object (410) and the processor (412) may compare the output of the scale (418) with a target weight for the 3D printed object (410). When the two values match, the scale-based measurement system (FIG. 1, 106) may trigger the controller (FIG. 1, 104) to terminate cleaning. In some examples, the processor (412) may be part of the controller (FIG. 1, 104). In other examples, the processor (412) may be distinct from the controller (FIG. 1, 104).

In yet another example, the measurement system (FIG. 1, 106) includes the robotic arm (412) that weighs the 3D printed object (410). In the example where an object weight is a termination condition, the robotic arm (412) may grasp the 3D printed object (410) and sensors within the robotic arm (412) may determine a weight of the 3D printed object (410) and the processor (412) may compare this measured weight with a target weight for the 3D printed object (410). When the two values match, the scale-based measurement system (FIG. 1, 106) may trigger the controller (FIG. 1, 104) to terminate cleaning.

Figure 5:
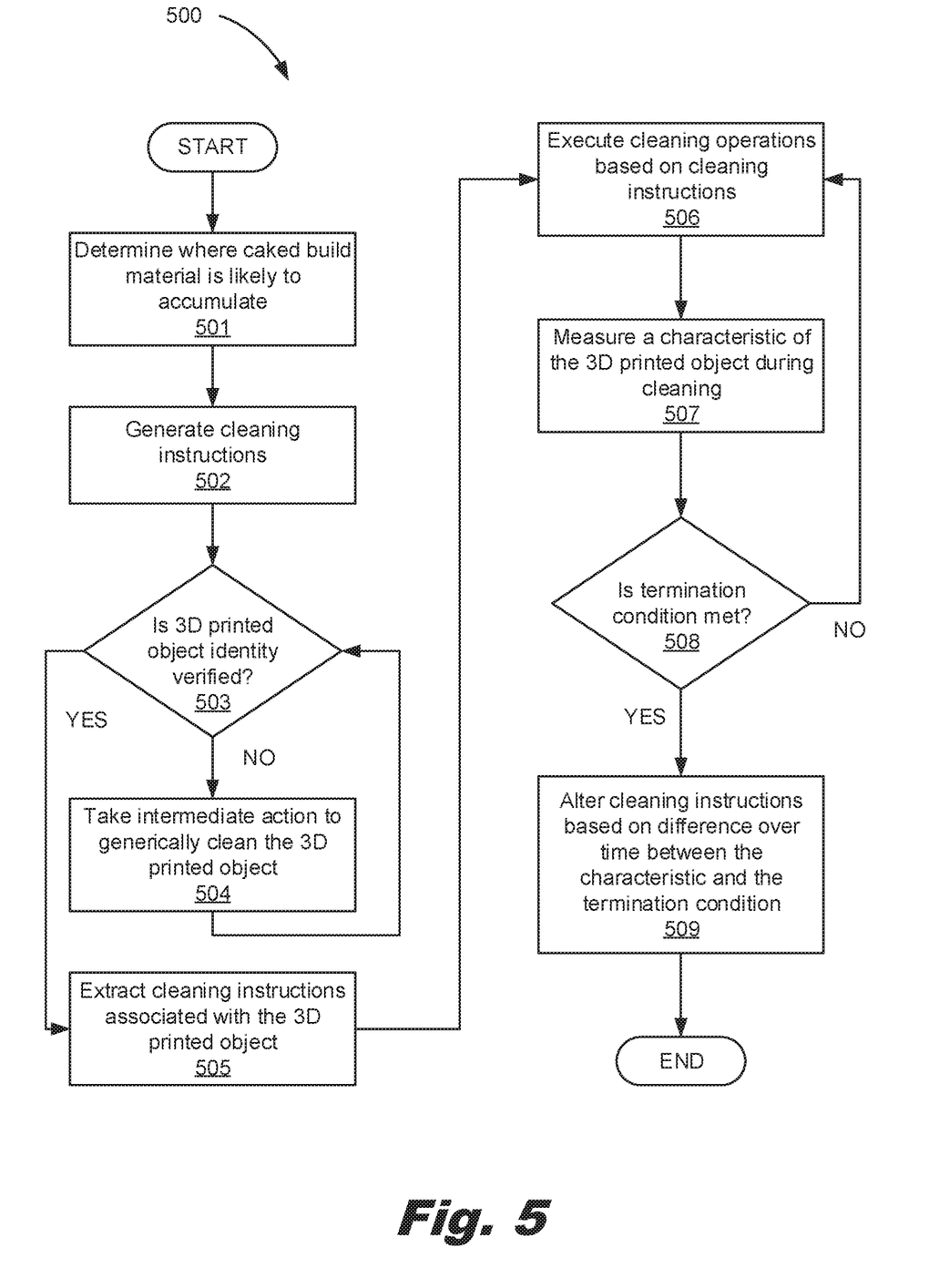
FIG. 5 is a flow chart of a method for 3D printed object cleaning, according to an example of the principles described herein.

FIG. 5 is a flow chart of a method (500) for 3D printed object (FIG. 4, 410) cleaning, according to an example of the principles described herein. According to the method (500), a location where caked build material is likely to accumulate on the 3D printed object (FIG. 4, 410) is determined (block 501). Such a determination may include modeling the physics of the powdered build material, and the additive manufacturing operation. That is, based on material and geometric properties it may be ascertainable which locations are more likely to experience caking based on thermal bleed for example. Such a model thereby provides an estimate of where caked (partially fused) powder will accumulate during the printing process. In some examples, the model may include externally supplied information about where caked powder is expected to accumulate and/or information recorded during fabrication of the 3D printed object (FIG. 4, 410) may add to the estimations of the location and extent of unwanted powder accumulation.

Cleaning instructions may then be generated (block 502). That is, the sequence of movements, cleaning devices, operations, strengths, etc. that make up the cleaning instructions are compiled together. In some examples, the cleaning instructions are based on determined locations where caked build material is likely to accumulate. That is, the cleaning operations may be more intense at these locations to ensure adequate material removal.

Such a generation (block 502) may include a variety of operations. For example, a database may include a variety of primitives, such as tool paths, basic cleaning operations such as a lateral scrub, a circular scrub, or a scrape. The generation (block 502) of the cleaning instructions therefore includes a compilation of different primitives and selected parameters for each routine to generate the overall cleaning instructions.

The compilation may be based on different criteria. For example, a user may input the different primitives. In another example, characteristics of the 3D printed object (FIG. 4, 410) may dictate certain cleaning parameters such as strength and grasp location. In yet another example, the generation (block 502) may be based on machine-learning. That is, based on historical information taken during a cleaning operation, a default cleaning primitive may be altered. For example, a default cleaning primitive may indicate a particular grasp strength for a particular type of grasp. However, historical information may indicate that for a particular thickness of build material, the particular grasp strength crushes the component. Accordingly, a machine-learning system may adjust the grasp strength based on this historical information.

As a particular example, the cleaning instructions may dictate grasp locations. The grasping locations can be provided by an operator heuristic or by a computer aided analysis that is meant to synthesize mechanical grasp given the characteristics of the gripping/grasping/suction device located at the cleaning station.

In some examples, the cleaning instructions include a sequence of grasp locations, each grasp location being associated with a cleaning of a particular region of the 3D printed object (FIG. 4, 410). That is, it may not be possible to clean an entire 3D printed object (FIG. 4, 410) by holding at just one location. This may be due to characteristics of the cleaning mechanisms. Accordingly, the cleaning instructions may include a first cleaning operation while the 3D printed object (FIG. 4, 410) is held in one orientation at one location. The instructions may then trigger re-gripping the 3D printed object (FIG. 4, 410) at a new location to facilitate cleaning of another portion of the 3D printed object (FIG. 4, 410).

The cleaning instructions may also include decaking, cleaning, and evaluation instructions. That is, not all 3D printed objects (FIG. 4, 410) will be cleaned the same. Either due to some heuristic from the user or a computer aided analysis, instructions first begin with motion primitives that are specific to the 3D printed object (FIG. 4, 410). These motion primitives are instantiated while the robot grasps the 3D printed object (FIG. 4, 410), changes the orientation and position of the 3D printed object (FIG. 4, 410), and when the robot moves the 3D printed object (FIG. 4, 410) through a cleaning station.

After the 3D printed object (FIG. 4, 410) has been formed, it is determined (block 503) if an identity of the 3D printed object (FIG. 4, 410) to be clean is unverified. That is, the 3D printed object (FIG. 4, 410) may be completely covered in powder and may be unrecognizable and associated cleaning instructions unextractable. Responsive to a determination that the identity of the 3D printed object (FIG. 4, 410) is unverified (block 503, determination NO), the 3D printed object (FIG. 4, 410) may be flagged as unrecognizable and an intermediate action may be taken (block 504) to generically clean the 3D printed object (FIG. 4, 410). For example, a user may manually clean the 3D printed object (FIG. 4, 410) or a more general post-processing operation that does not account for specific geometric and material properties, such as an automatic sand blaster, may be used. In either case, the excess powder may be removed until the 3D printed object (FIG. 4, 410) can be recognized for specific cleaning instructions.

Once the 3D printed object (FIG. 4, 410) identify is verified (block 503, determination YES), the cleaning instructions may be extracted (block 505) as described above in connection with FIG. 2. That is, once the 3D printed object (FIG. 4, 410) is recognized and oriented, the information regarding grasping, manipulation, decaking and cleaning is sent to the controller (FIG. 1, 104) which executes (block 506) cleaning operations based on the cleaning instructions. This may be performed as described above in connection with FIG. 2.

Similar to as described in connection with FIG. 2, characteristics of the 3D printed object (FIG. 4, 410) are measured (block 507) and it is determined whether the termination condition is met (block 508). If the termination condition is not met (block 508, determination NO), the cleaning instructions are executed (block 506) and characteristics are measured (block 507) iteratively until the termination condition is met (block 508, determination YES). In some examples, subsequent iterations of the cleaning instructions are altered from previous iterations. For example, a second round of cleaning instructions may be more intense to clean off caked build material that is more stubbornly attached to the 3D printed object (FIG. 4, 410). Once the termination condition is met (block 508, determination YES), the cleaning operation is terminated.

In some examples, the method (500) includes altering (block 509) the cleaning instructions based on differences over time between the characteristic and the termination condition. That is, as described above, throughout the cleaning operation, the measurement system (FIG. 1, 106) may monitor object cleaning and periodically output characteristics of the 3D printed object (FIG. 4, 410). If it is determined that the termination conditions are met after a long period of time, the cleaning instructions may be changed for subsequent instances, for example by using a higher strength cleaning operation or a longer period of time with a particular cleaning modality. In another example, it may be determined that the executed cleaning instructions may result in damage to a part. Accordingly, the cleaning instructions generated (block 502) for subsequent cycles may be altered. In other words, the present method (500) provides a closed-loop feedback to tailor and hone cleaning instructions based on data collected during actual part cleaning.

In some examples, the alteration (block 509) of the cleaning instructions may be implemented on subsequent instances of the same 3D printed object (FIG. 4, 410) or a different 3D printed object (FIG. 4, 410). For example, other 3D printed objects (FIG. 4, 410) may have similar geometries as a recently formed 3D printed object (FIG. 4, 410). In this example, the cleaning instructions for the to-be-formed 3D printed object (FIG. 4, 410) may be altered based on the above described recorded result of the cleaning of the recently-formed 3D printed object (FIG. 4, 410).

As described above, the alterations (block 509) described above may be for a subsequent cleaning operation. However, in other examples, the adjustments may be dynamic and applied to a current cleaning operation. For example, the cleaning instructions may include multiple routines and if after a predetermined period of time a first routine has not adequately cleaned a part, a different and more intense, routine may be implemented. As described above, this may take the form of increasing the intensity of the cleaning instructions after a first iteration has not sufficiently cleaned the 3D printed object (FIG. 4, 410).

Figure 6:
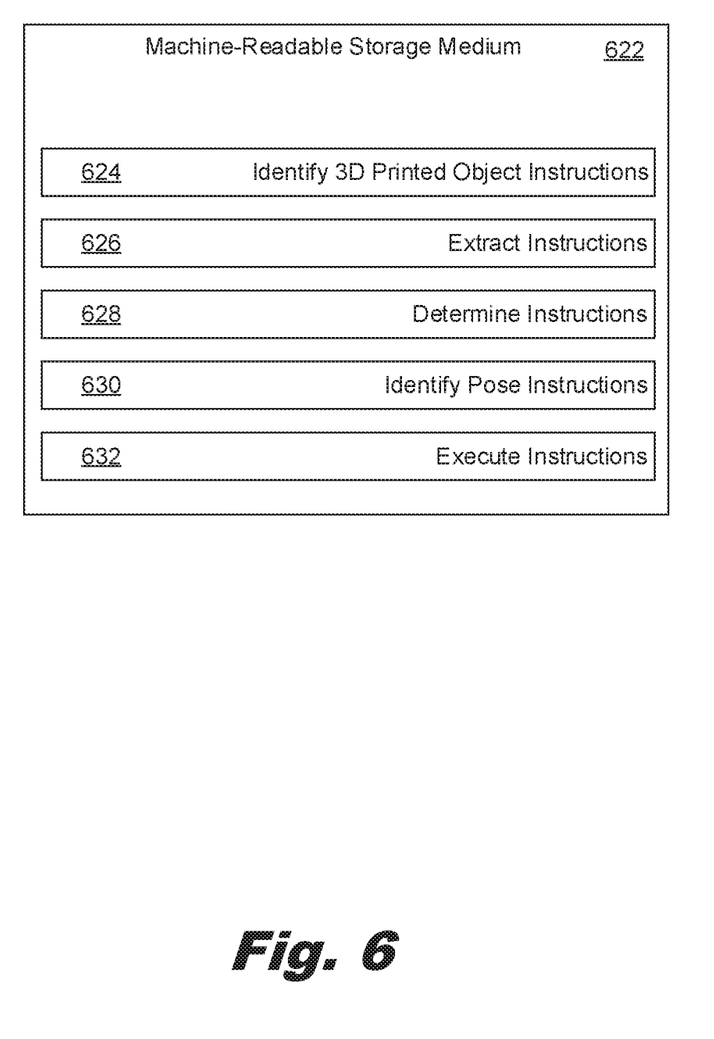
FIG. 6 depicts a non-transitory machine-readable storage medium for 3D printed object cleaning, according to another example of the principles described herein.

FIG. 6 depicts a non-transitory machine-readable storage medium (622) for 3D printed object (FIG. 4, 4 10) cleaning, according to another example of the principles described herein. To achieve its desired functionality, a computing system includes various hardware components. Specifically, a computing system includes a processor and a machine-readable storage medium (622). The machine-readable storage medium (622) is communicatively coupled to the processor. The machine-readable storage medium (622) includes a number of instructions (624, 626, 628, 630, 632) for performing a designated function. The machine-readable storage medium (622) causes the processor to execute the designated function of the instructions (624, 626, 628, 630, 632).

Referring to FIG. 6, identify 3D printed object (FIG. 4, 410) instructions (624), when executed by the processor, cause the processor to identify a 3D printed object (FIG. 4,4 10). Extract instructions (626), when executed by the processor, may cause the processor to, extract cleaning instructions associated with the 3D printed object (FIG. 4, 410). Determine instructions (628), when executed by the processor, may cause the processor to, determine from the cleaning instructions, cleaning device parameters specific to the cleaning devices of a cleaning station. Identify pose instructions (630), when executed by the processor, may cause the processor to identify a pose of the 3D printed objects (FIG. 4, 410). Execute instructions (632), when executed by the processor, may cause the processor to execute cleaning operations based on the cleaning instructions.

Such systems and methods 1) provide accurate 3D printed object cleaning; 2) allow for complex cleaning operations to be executed with precision; 3) provide customized cleaning operations that are specific, and not generic; and 4) increase safety and efficiency of 3D printed object cleaning. However, it is contemplated that the devices disclosed herein may address other matters and deficiencies in a number of technical areas.

What is claimed is:

1. A system, comprising:
    a reader to extract cleaning instructions associated with a three-dimensional (3D) printed object, the cleaning instructions comprising a termination condition to indicate when object cleaning is complete, wherein the cleaning instructions are generated based on modeling the physics of build material, geometry of the 3D printed object, and operations of an additive manufacturing process of the 3D printed object;
    a controller to instruct at least one cleaning device to clean the 3D printed object based on the cleaning instructions; and
    a measurement system to determine when the termination condition is met.

2. The system of claim 1, wherein the measurement system comprises:
    a number of cameras to capture images of the 3D printed object; and a processor to compare a termination condition of the 3D printed object with an output of the number of cameras.

3. The system of claim 1, wherein the measurement system comprises:
   a scale to weigh the 3D printed object; and
   a processor to compare a weight of the 3D printed object with a weight-based termination condition.

4. The system of claim 1, wherein the reader is to identify the 3D printed object by performing at least one of:
   physical analysis of the 3D printed object; and
   extraction of encoded identifying data from the 3D printed object.

5. The system of claim 1, wherein the reader is to extract cleaning instructions associated with the 3D printed object by performing at least one of:
   extracting encoded cleaning instructions from the 3D printed object; and
   extracting the cleaning instructions from a location referenced by encoded data on the 3D printed object.

6. The system of claim 1, further comprising a pose determining system to identify a pose of the 3D printed object.

7. A method, comprising:
   generating cleaning instructions based on modeling the physics of build material, geometry of the 3D printed object, and operations of an additive manufacturing process of the 3D printed object;
   extracting cleaning instructions associated with a three-dimensional (3D) printed object, wherein the cleaning instructions comprise a termination condition to indicate when object cleaning is complete;
   executing cleaning operations based on the cleaning instructions;
   measuring a characteristic of the 3D printed object during execution of the cleaning operations; and
   responsive to the characteristic meeting the termination condition, terminating the cleaning operations.

8. The method of 7, wherein the cleaning instructions comprise at least one of:
   grasp parameters for the 3D printed object during cleaning;
   a sequence of cleaning operations;
   a duration of each cleaning operation;
   a sequence of cleaning motions;
   indication of cleaning modalities;
   tool paths; and
   cleaning forces.

9. The method of claim 7, wherein the cleaning instructions comprise a sequence of grasp locations, each grasp location associated with a cleaning of a particular region of the 3D printed object.

10. The method of claim 7, wherein:
    the method further comprises determining where caked build material is likely to accumulate on the 3D printed object; and
    the cleaning instructions are based on determined locations where caked build material is likely to accumulate.

11. The method of claim 7, wherein the termination conditions are selected from the group consisting of:
    a target color for the 3D printed object;
    a target weight for the 3D printed object;
    a target reflectivity for the 3D printed object; and
    a target geometry for the 3D printed object.

12. The method of claim 7, further comprising:
    determining that an identity of the 3D printed object is unverified; and
    responsive to a determination that an identity of the 3D printed object is unverified, taking an intermediate action to clean the 3D printed object.

13. A non-transitory machine-readable storage medium encoded with instructions executable by a processor, the machine-readable storage medium comprising instructions to:
    identify a three-dimensional (3D) printed object;
    extract cleaning instructions associated with the 3D printed object, wherein the cleaning instructions are generated based on modeling the physics of build material, geometry of the 3D printed object, and operations of an additive manufacturing process of the 3D printed object;
    determine from the cleaning instructions, cleaning device parameters specific to the cleaning devices of a cleaning station;
    identify a pose of the 3D printed object to identify grasping locations indicated in the cleaning instructions; and
    execute cleaning operations based on the cleaning instructions.

14. The non-transitory machine-readable storage medium of claim 13, further comprising instructions to alter cleaning instructions based on differences over time between a characteristic and a termination condition.

* * * * *